US009212675B2

(12) United States Patent
Oetlinger

(10) Patent No.: US 9,212,675 B2
(45) Date of Patent: Dec. 15, 2015

(54) FASTENING ARRANGEMENT AND METHOD

(71) Applicant: Blanking Systems, Inc., Grafton, WI (US)

(72) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 261 days.

(21) Appl. No.: 13/796,113

(22) Filed: Mar. 12, 2013

(65) Prior Publication Data

US 2014/0259624 A1   Sep. 18, 2014

(51) Int. Cl.
*F16B 7/18* (2006.01)

(52) U.S. Cl.
CPC ............... *F16B 7/187* (2013.01); *F16B 7/182* (2013.01); *Y10T 29/49948* (2015.01)

(58) Field of Classification Search
CPC ...... F16B 7/187; F16B 7/0473; F16B 7/0466; F16B 7/0453; F16B 12/32; F16B 12/30; F16B 12/50; Y10T 403/4662; Y10T 403/4668; Y10T 403/4671; Y10T 403/4677; Y10T 403/4674; Y10T 403/4681; Y10T 403/4682; Y10T 403/4685
See application file for complete search history.

(56) References Cited

U.S. PATENT DOCUMENTS

| 2,784,812 | A | 3/1957 | Kindorf | |
|---|---|---|---|---|
| 5,192,145 | A | 3/1993 | Rixen et al. | |
| 5,570,971 | A | 11/1996 | Rixen et al. | |
| 6,382,866 | B1 * | 5/2002 | Zihlmann | 403/255 |
| 6,712,540 | B2 * | 3/2004 | Schmalzhofer et al. | 403/248 |
| 7,293,935 | B2 | 11/2007 | Band et al. | |
| 8,794,861 | B2 * | 8/2014 | Holscher | 403/253 |
| 8,813,344 | B2 * | 8/2014 | Stauβ | 29/525.11 |
| 2004/0025459 | A1 * | 2/2004 | Huebner et al. | 52/282.1 |

FOREIGN PATENT DOCUMENTS

| EP | 1199481 A1 * | 4/2002 | ............... F16B 7/18 |
|---|---|---|---|
| EP | 2450580 A1 * | 5/2012 | |

* cited by examiner

*Primary Examiner* — Daniel Wiley
(74) *Attorney, Agent, or Firm* — Boyle Fredrickson, S.C.

(57) ABSTRACT

A fastening arrangement and method are provided for coupling a pair of frame members together. The fastening arrangement includes an insert receivable in a slot of one of the frame members. A fastener couples the insert with a receiver, such as a nut or a second insert, receivable in the other of the frame members. The insert includes a notch or similar indicator for indicating the appropriate depth to which the insert is to be driven relative to one of the frame members. The insert includes a threaded portion. The threads of the threaded portion are configured to be embedded into one of the frame members as the insert is driven relative to one of the frame members to secure the insert thereto.

15 Claims, 4 Drawing Sheets

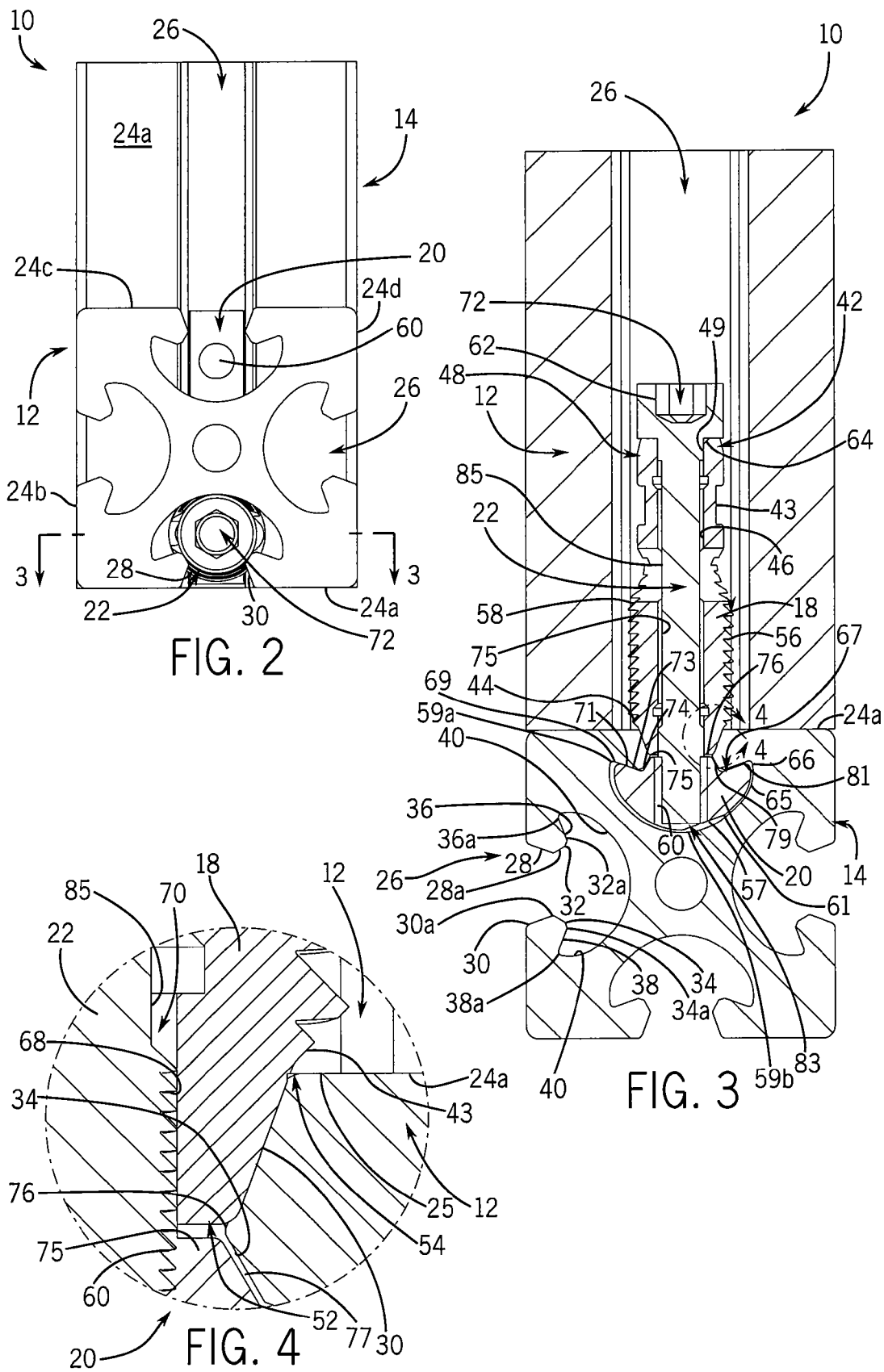

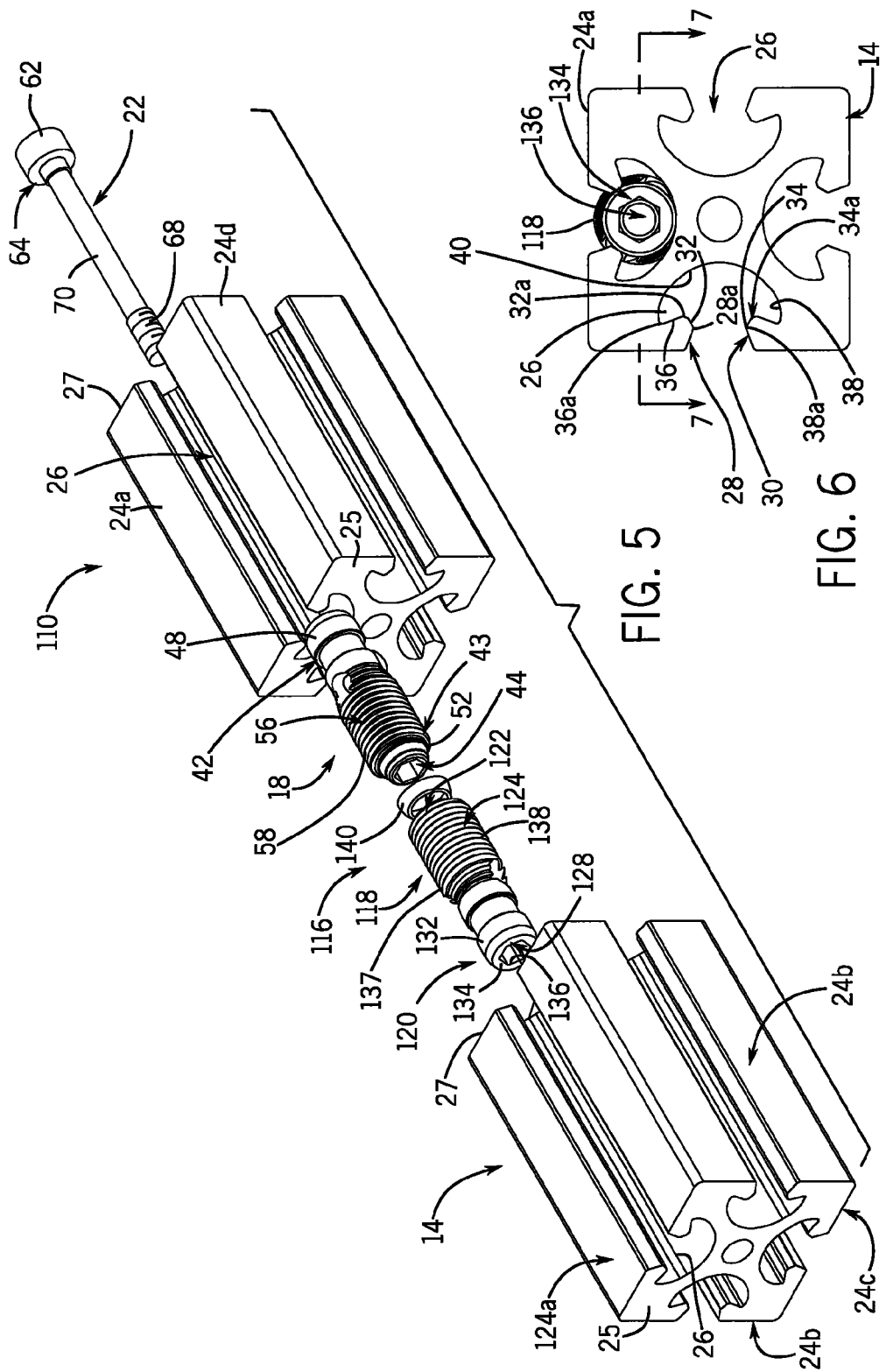

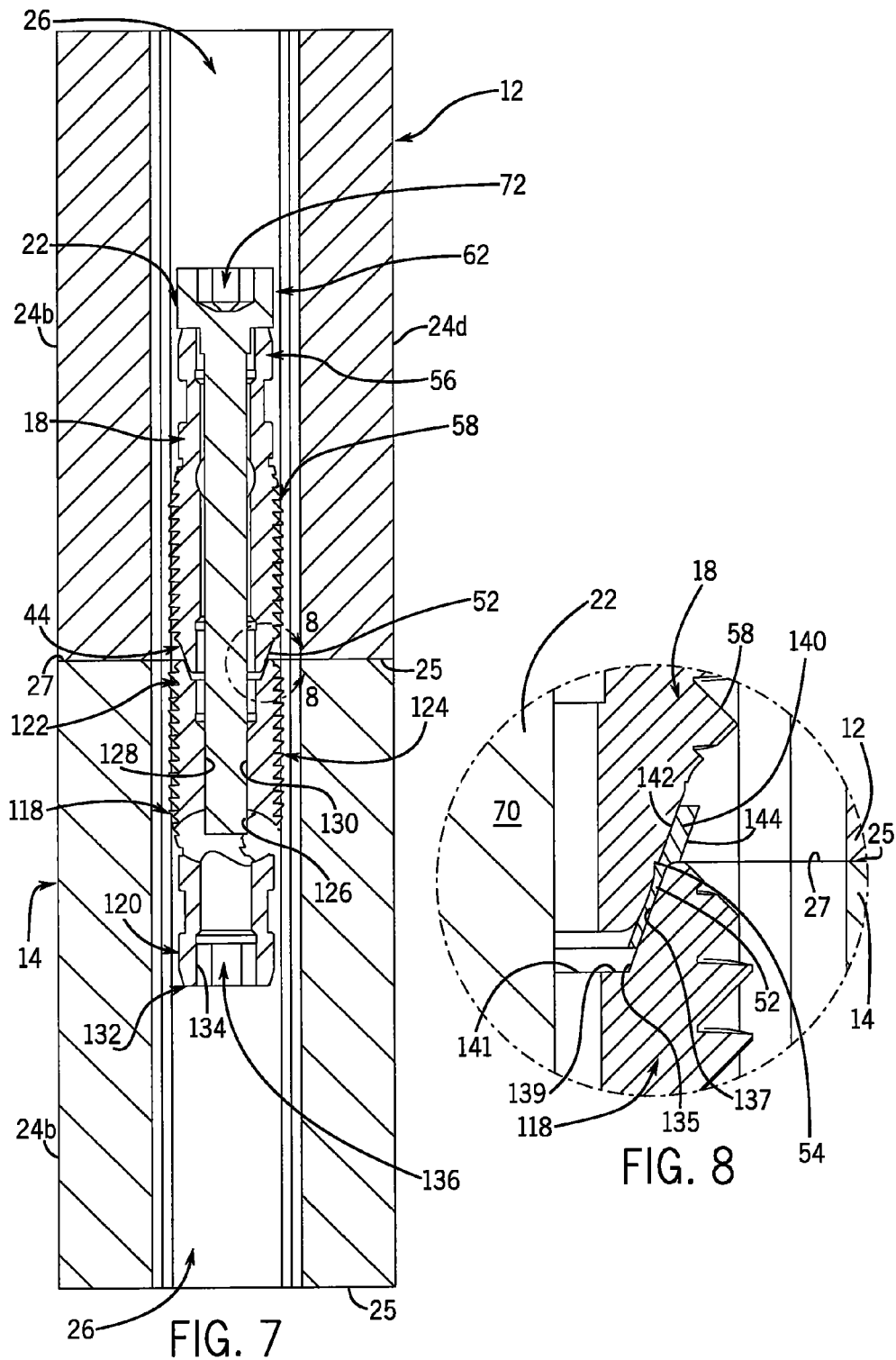

FASTENING ARRANGEMENT AND METHOD

FIELD OF THE INVENTION

The present invention relates generally to fastening arrangements, and in particular, to a fastening arrangement for mechanically interlocking structural frame members together.

BACKGROUND AND SUMMARY OF THE INVENTION

As is known, structural frame members are used in the construction of a wide variety of products, including everything from automation equipment and furniture to buildings and the like. Typically, these structural frame members take the form of horizontal and vertical frame members tied together by corner pieces, joints or bonding to form a desired frame. Coverings, such as panels, may be secured to the frame members to provide an aesthetically pleasing appearance. In addition, various components may be interconnected to the structural frame members to allow for the constructed product to be used for its intended purpose. By way of example, hinges may be interconnected to the structural frame members to facilitate the mounting of a door thereto. Alternatively, sliders may be interconnected to the sides of a structural frame members so as to allow the frame to function as a drawer. It can be appreciated that other types of components may be interconnected to the structural frame members to facilitate the intended purpose thereof.

Typically, the frame members defining the product or frame are held together by means of friction. For examples, nut and bolt combinations are often used to secure horizontal and vertical frame members together. However, the nut and bolt combinations holding the structural frame members together often come loose over time when subjected to vibration and/or the environment. As the nut and bolt combinations loosen, the integrity of the frame or product constructed from the structural frame members may be compromised. Further, as the nut and bolt combinations loosen, the frame members and the components therefore may rotate with respect to one another, thereby compromising the alignment of the structural frame members.

Therefore, it is a primary object and feature of the present invention to provide to a fastening arrangement incorporating an insert for mechanically interlocking a pair of structural frame members to each other wherein the structural frame members remain interlocked during repeated use.

It is a further object and feature of the present invention to provide a fastening arrangement incorporating an insert for mechanically interlocking a pair of structural frame members to each other wherein the frame members may be simply and easily connected.

It is a still further object and feature of the present invention to provide a fastening arrangement incorporating an insert for mechanically interlocking a pair of structural frame members to each other so as to allow the frame members to be adapted for a variety of uses.

In accordance with the present invention, a fastening arrangement is provided for joining first and second frame members to one another. Each of the first and second frame members includes an elongated slot formed therein and a first face communicating with the slot. The fastening arrangement includes a first insert receivable in the slot of the first frame member. The first insert has a first and second opposite ends, an outer surface having threaded portion and notch formed therein, and a through bore. A fastener is extendable through the through bore of the first insert and includes a threaded portion. A receiver is receivable within the slot in the second frame member and is adapted for receiving at least a portion of the threaded portion of the fastener therein for coupling the first and second frame members. The notch in the outer surface of the first insert is generally co-planar with the face of the first frame member with the first insert received in the slot of the first frame member so as to align the first insert within the slot of the first frame member.

The receiver may include a nut having a bore for receiving the threaded portion of the fastener therein in a mating relationship. Alternatively, the receiver may include a second insert receivable in the slot of the second frame member. The second insert includes first and second opposite ends, and an inner surface defining a through bore therebetween. The inner surface includes a threaded portion adapted for receiving the threaded portion of the fastener in a mating relationship. A centering member is positionable between the first and second inserts for centering the first and second inserts relative to one another along a common axis.

The threaded portion of the outer surface of the first insert is embeddable in the first frame member for securing the first insert thereto. The first insert extends along an axis and the outer surface of the first insert expands radially outward with respect to the axis in response to the threading of the threaded portion of the fastener into the receiver. The slot in the first frame member extends along an axis between the first face and a second face thereof and the first insert extends along the axis of the slot in the first frame member. The slot in the second frame member also extends along an axis between the first face and a second face thereof. The second insert extends along the axis of the slot in the second frame member.

In accordance with a further aspect of the present invention, a fastening arrangement is provided for joining first and second frame members to one another. Each of the first and second frame members includes an elongated slot formed therein and a first face communicating with the slot. The fastening arrangement includes a first insert receivable in the slot of the first frame member. The first insert has first and second opposite ends, an outer surface having threaded portion, and a through bore. A fastener is extendable through the through bore of the first insert and includes a threaded portion. A receiver is receivable within the slot in the second frame member and is adapted for receiving at least a portion of the threaded portion of the fastener therein for coupling the first and second frame members. A centering member is positionable between the first and second inserts for centering the first and second inserts relative to one another along a common axis with the first and second frame members coupled.

The receiver may include a bore for receiving the threaded portion of the fastener therein in a mating relationship. For example, the receiver may include a second insert receivable in the slot of the second frame member. The second insert includes a first and second opposite ends, and an inner surface defining a through bore therebetween. The inner surface has a threaded portion adapted for receiving the threaded portion of the fastener in a mating relationship. The threaded portion of the outer surface of the first insert is embeddable in the first frame member for securing the first insert thereto.

The first insert extends along an axis and the outer surface of the first insert expands radially outward with respect to the axis in response to the threading of the threaded portion of the fastener into the receiver. The outer surface of the first insert may includes a notch formed therein. The slot in the first frame member extends along an axis between the first face and a second face thereof. The first insert is inserted into the slot of the first frame member along the axis thereof. The notch in the outer surface of the first insert is aligned with the first face of the first frame member with the first insert properly received in the slot of the first frame member.

In accordance with a still further aspect of the present invention, a method is provided of joining first and second frame members to one another. Each of the first and second frame members includes an elongated slot formed therein and a first face communicating with the slot. The method includes the step of positioning a first insert into the slot of the first frame member such that an indicator on a surface of the first insert is generally co-planar with the first face of the first frame member. A receiver having a bore is placed into the slot of the second frame member and a fastener is inserted through the first insert and into engagement with the receiver so as to join the first frame member and the second frame member.

The step of inserting the fastener may include the additional step of urging the surface of the first insert outward in response to the engagement of the fastener into the receiver. The first and second frame members may be positioned perpendicular to one another or longitudinally aligned relative to one another. The receiver may include a second insert receivable in the slot of the second frame member. The second insert includes first and second opposite ends, and an inner surface defining a through bore therebetween. The inner surface of the second insert is adapted for receiving the fastener in a mating relationship. A centering member may be positioned between the first insert and the second insert to center the first and second frame inserts relative to one another along a common axis as the first frame member and the second frame member are joined. The receiver may include a nut having a bore therethrough for receiving the fastener in a mating relationship.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 2 is top plan view of the frame assembly of FIG. 1;

FIG. 3 is a cross sectional view of the frame assembly taken along line 3-3 of FIG. 2;

FIG. 4 is a cross sectional view of the frame assembly taken along line 4-4 of FIG. 3;

FIG. 5 is an exploded isometric view of a frame assembly including first and second rails connected to one another via an alternative embodiment of a fastening arrangement in accordance with the present invention;

FIG. 6 is a top plan view of the frame assembly of FIG. 5;

FIG. 7 is a cross-sectional view of the frame assembly taken along line 7-7 of FIG. 6; and FIG. 8 is a cross-sectional view of the frame assembly taken along line 8-8 of FIG. 7.

DETAILED DESCRIPTION OF THE DRAWINGS

Figure 1:
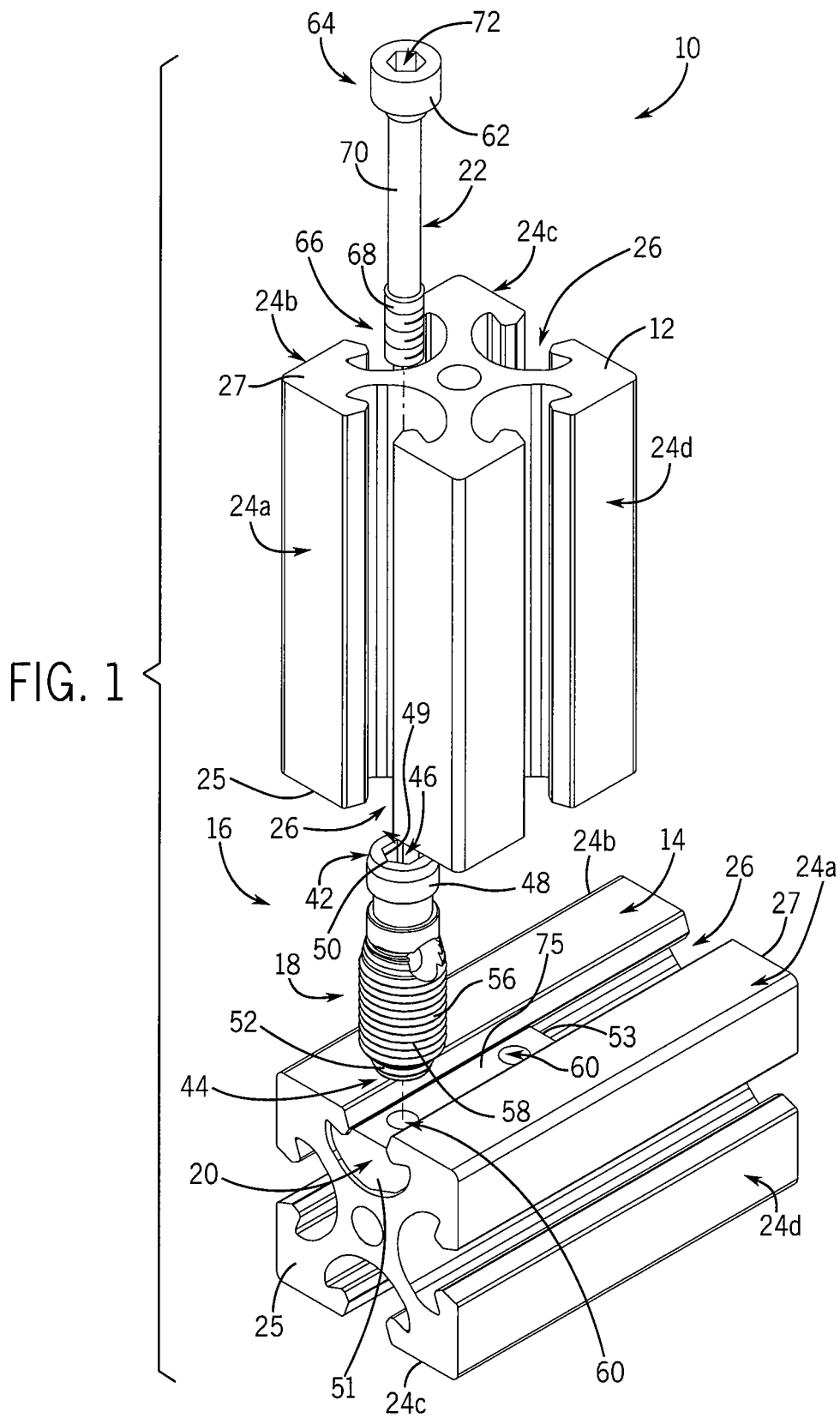
FIG. 1 is a partially exploded isometric view of a frame assembly including first and second rails connected to one another via a fastening arrangement in accordance with the present invention.

Referring now to the Drawings, and initially FIG. 1, a frame assembly 10 constructed from components in accordance with the present invention is illustrated. As hereinafter described, the components of the present invention may be used to construct frame assemblies of various configurations. As such, frame assembly 10 is merely exemplary of the type of frame assembly that may be constructed utilizing the components of the presents. Other configurations of frame assembly 10 are contemplated as being within the scope of the present invention.

The frame assembly 10 includes a first frame member 12 which may be selectively coupled to a second frame member 14 by means of fastening arrangement 16. Fastening arrangement 16 includes insert 18, nut 20 and fastener 22, such as a screw, bolt or the like. The frame assembly 10 may be configured to cooperate with one or more additional frame assemblies or frame members to form a structure, such as a door frame or the like.

With additional reference to FIG. 3, it is noted that first and second frame members 12 and 14, respectively, are identical in structure and, as such, the description hereinafter of the first frame member 14 is understood to describe the second frame member 16, as if fully described herein. First frame member 12 has a generally square configuration and extends along a longitudinal axis. First frame member 12 is defined by four faces 24a-24d. Each face 24a-24d is identical in structure, and as such, the description hereinafter of face 24a is understood to describe faces 24b-24d, as if fully described herein. Face 24a of the first frame member 12 is generally flat and includes a slot 26 that extends along the entire length of the first frame member 12 between ends 25 and 27. Each slot 26 is defined by first and second sidewalls 28 and 30, respectively, extending from face 24a at an angle with respect thereto. It is contemplated that the angle fall within the range of 1 degree and 89 degrees but is preferably between about 30 to 80 degrees and most preferably about 65 degrees. Slot 26 is further defined by first and second outer abutment walls 32 and 34 respectively, which diverge from corresponding terminal edges 28a and 30a, respectively, of first and second sidewalls 28 and 30, respectively. First abutment wall 32 is at an angle to first sidewall 28 and second abutment wall 34 is at an angle to second sidewall 30. First and second inner abutment walls 36 and 38, respectively, diverge from each other and extend from inner edges 32a and 34a, respectively, of first and second outer abutment walls 32 and 34, respectively. Concave terminal wall 40 extends between terminal edges 36a and 38a, respectively, of first and second inner abutment walls 36 and 38, respectively. Slot 26 is configured to conform to the shape of nuts 20 received therein as will be described.

With continuing reference to FIGS. 1 and 3, insert 18 is generally cylindrically shaped and includes a first end 42, a second opposite end 44, and an outer surface 43. Insert 18 further includes an inner surface 75 defining through-bore 46 or opening through which fastener 22 may be received. The inner diameter of insert 18 may be similarly sized to the outer diameter of fastener 22 to form a secure connection therebetween. Head portion 48 is provided at first end 42 of insert 18 and defines an outwardly extending collar integrally formed with the rest of insert 18. Head portion 48 includes a recess 49 communicating with bore 46 to receive the shaft of fastener 22 therethrough. Recess 49 in first end 42 of insert 18 defines a socket 50 having a hexagonal or other polygonal or non-polygonal cross-section adapted for receiving a tool or other instrument configured for engagement therewith in a mating relationship. It can be appreciated that socket 50 may have other configurations without deviating from the scope of the present invention.

As best seen in FIG. 4, outer surface 43 of insert 18 includes a terminal portion 52 adjacent second end 44 thereof. Terminal portion 52 of outer surface 43 has a generally frustoconical configuration adapted to be received between first and second sidewalls 28 and 30, respectively, defining slot 26 in a corresponding face 24b-24d of a frame member, e.g. first and second frame members 12 and 14, respectively. Terminal portion 52 of outer surface 43 further includes notch 54. As hereinafter described, notch 54 is configured to indicate to a user of insert 18 the depth with which to drive insert 18 into one of first and second frame members 12 and 14, respectively.

Outer surface 43 of the insert 18 further includes a body portion 56 formed between the first and second ends 42 and 44, respectively, thereof. Body portion 56 includes threads 58 disposed about the circumference thereof. Threads 58 are intended for threading insert 18 into slot 26 in a corresponding face 24b-24d of a frame member, e.g. first and second frame members 12 and 14, respectively, as hereinafter described.

Nut 20 is configured to be slidably or otherwise inserted into one of slots 26 in the first and second frame members 12 and 14, respectively. Nut 20 is defined by first and second end faces 51 and 53, respectively. First and second end faces 51 and 53, respectively, are spaced by a generally convex surface 57. Surface 57 of nut 20 includes first arcuate portion 59 having an outer edge 59a and an inner edge 59b. First flat portion 61 extends from inner edge 59b of first arcuate portion 59 and terminates at edge 63 which is generally parallel to inner edge 59b. Second arcuate portion 65 of surface 57 extends from edge 63 and terminates at terminal edge 66.

Nut 20 further includes engagement surface 67 extending from first end face 51 to second end face 53, and between outer edge 59a and edge 66. Engagement surface 67 is defined by first outer abutment wall 69 extending from outer edge 59a and terminating at edge 71. First inner abutment wall 73 extends from edge 71 and terminates at edge 74. Generally planar upper face 75 of engagement surface 67 of nut 20 extends from edge 74 to edge 76. Threaded apertures 60 extend into upper face 75 along corresponding axes generally perpendicular thereto, for reasons hereinafter described. The number and location of apertures provided in upper face 75 may vary without deviating from the scope of the present invention. Second inner abutment wall 77 extends from edge 76 and terminates at inner edge 79. Second outer abutment wall 81 extends from inner edge 79 and terminates at terminal edge 66. As best seen in FIG. 3, first and second inner abutment walls 73 and 77, respectively, diverge from each other and first and second outer abutment walls 69 and 81, respectively, also diverge from each other, for reasons hereinafter described.

Fastener 22 includes head 62 at first end 64 thereof. Head 62 includes recess 72 therein which defines a socket having a hexagonal or other polygonal or non-polygonal cross-section adapted for receiving a tool or other instrument configured for engagement therewith in a mating relationship. It can be appreciated that the socket may have other configurations without deviating from the scope of the present invention. Fastener 22 is further defined by a second end 83, opposite to first end 64, and an outer surface 85, defining a generally cylindrical shank 70. Shank 70 has a diameter less than the diameter of through-bore 46 through insert 18 so as to allow shank 70 to pass therethrough. Outer surface 85 includes a threaded portion 68 for receipt in a threaded aperture 60 in nut 20.

With additional reference now to FIGS. 2 and 4, first and second frame members 12 and 14, respectively, are coupled to one another by fastening arrangement 16, as hereinafter described. More specifically, nut 20 is positioned in slot 26 in a desired face, e.g. face 24a, of second frame member 14 at a predetermined location. By way of example, nut 20 is positioned such that first end 51 of nut 20 is adjacent a desired end, e.g. end 25, of second frame member 14. In addition, insert 18 is threaded into a desired slot 26 in a desired face, e.g. face 24a, of first frame member 12 such that threads 58 in outer surface 43 of the insert 18 mesh with first and second outer abutment walls 32 and 34, respectively, and wall 40 defining slot 26, thereby securely retain insert 18 therein. Insert 18 is threaded into a desired slot 26 until such point as notch 54 in outer surface 43 of insert 18 is aligned in a generally common plane with a selected end, e.g. end 25, of first frame member 12, FIG. 4. In this manner, the user of the fastening arrangement 16 is able to determine when to cease advancing insert 18 to prevent over tightening and potentially damaging first and second frame members 12 and 14, respectively.

With insert 18 threaded into slot 26 in first frame member 12, first and second frame members 12 and 14, respectively, are position adjacent each other, such that end 25 of first frame member 12 abuts face 24a of second frame member 14. In addition, terminal portion 52 of outer surface 43 of insert 18 is seated between first and second sidewalls 28 and 30, respectively, defined partially slot 26 in face 24a of second frame member 14 and second end 44 of insert 18 engages upper face 75 of nut 20. As described, it is intended for first and second frame members 12 and 14, respectively, to be positioned such that bore 46 through insert 18 is axially aligned with a desired threaded aperture 60 in nut 20.

Once bore 46 through insert 18 is axially aligned with a desired threaded aperture 60 in nut 20, fastener 22 is inserted through the bore 46 of the insert 18 and advanced so as to engage bore 60 in nut 20. Thereafter, a tool or other instrument may be used to engage recess 72 in head 62 of fastener 22 in a mating relationship to facilitate the threading of threaded portion 68 of shaft 70 of fastener 22 into aperture 60 in nut 20. It can be appreciated that as fastener 22 is tightened onto nut 20, first and second frame members 12 and 14, respectively, become joined. Further, it is noted the terminal portion 52 of outer surface 43 of insert 18 seated between first and second sidewalls 28 and 30, respectively, expands and becomes embedded into first and second sidewalls 28 and 30, respectively, of second frame member 14. The embedding of the terminal portion 52 of outer surface 43 of insert 18 relative to the second frame member 14 serves to fix the first frame member 12 with respect to second frame member 14 thereby causing frame assembly 10 to resist torsional forces which may be applied thereto.

Referring generally to FIGS. 5-8, and in particular to FIG. 5, an alternative construction of the frame assembly 110 is illustrated. The frame assembly 110 is configured so that first and second frame members 12 and 14, respectively, are coupled to one another in a end-to-end abutting manner so as to form a longitudinally extending frame structure. First and second frame members 12 and 14, respectively, are configured to be joined to one another by a fastening arrangement, generally designated by the reference numeral 116.

Fastening arrangement 116 includes first insert 18, as heretofore described, and a second insert 118 configured to be coupled to one another. Second insert 118 has a generally cylindrically shape and includes a first end 120, a second opposite end 122, and an outer surface 124. Second insert 118 further includes an inner surface 126 defining a through-bore 128 or opening in which fastener 22 may be received. Inner surface 126 of second insert 118 includes a threaded portion 130 adapted for receiving threaded portion 68 of shaft 70 of fastener 22 in a mating relationship, as hereinafter described. Head portion 132 is provided at first end 120 of second insert 118 and defines an outwardly extending collar integrally formed with the rest of second insert 118. Head portion 132 includes a recess 134 therein that defines socket 136 having a hexagonal or other polygonal or non-polygonal cross-section and being adapted for receiving a tool or other instrument configured for engagement therewith in a mating relationship. It can be appreciated that the socket 136 may have other configurations without deviating from the scope of the present invention.

Second end 122 of second insert 118 includes a frustoconical recess 135 formed therein. Recess 135 is defined by sidewall 133 projecting along the axis of bore 128 and terminal wall 139, generally perpendicular to the axis of bore 128. Terminal wall 139 includes an opening 141 therein communicating with bore 128 so as to allow shaft 70 of fastener 22 to pass therethrough, as hereinafter described. Outer surface 124 of second insert 118 includes body portion 137 integrally formed between first and second ends 120 and 122, respectively, thereof. Body portion 137 includes threads 138 disposed about the circumference thereof. Threads 138 are intended for threading second insert 118 into the slot 26 in a corresponding face 24b-24d of a frame member, e.g. first and second frame members 12 and 14, respectively, as hereinafter described.

Fastening arrangement 116 further includes a centering member 140 configured to be received between the first and second inserts 18 and 118, respectively, when assembled. Centering member 140 has a generally frustoconical shape defined by inner and outer surface 142 and 144, respectively. As best seen in FIG. 8, outer surface 144 of centering member 140 includes a generally ring-shaped shoulder 146 formed therein. Shoulder 146 is adapted for engagement with second end 122 of second insert 118, as hereinafter described.

With additional reference to FIGS. 6 and 8, first and second frame members 12 and 14, respectively, are coupled to one another by fastening arrangement 116. More specifically, insert 18 is threaded in an end, e.g. end 25, of first frame member 12 and into a desired slot 26 in a desired face, e.g. face 24a, of first frame member 12 such that threads 58 in outer surface 43 of the insert 18 mesh with first and second outer abutment walls 32 and 34, respectively, and wall 40 defining slot 26, thereby securely retaining inset 18 therein. Insert 18 is threaded into a desired slot 26 until such point as notch 54 in outer surface 43 of insert 18 is aligned in a generally common plane with a selected end, e.g. end 25, of first frame member 12. In this manner, the user of fastening arrangement 116 is able to determine when to cease advancing insert 18 into first frame member 12 so as to prevent over tightening and potential damage to first frame member 12.

In addition, second insert 118 is threaded in an end, e.g. end 27, of second frame member 14 and into slot 26 in a desired face, e.g. face 24a, of second frame member 14 such that threads 138 about body portion 137 of second insert 118 mesh with first and second outer abutment walls 32 and 34, respectively, and wall 40 defining slot 26, thereby securely retaining second inset 118 therein. Second insert 118 is threaded into slot 26 until such point as second end 122 of second insert 118 is generally co-planar with a selected end, e.g. end 27, of second frame member 14. Centering member 140 is seated within recess 134 in second end 122 of second insert 118 such that shoulder 146 of centering member 140 engages second end 122 of second insert 118, FIG. 8.

With insert 18 threaded into slot 26 in first frame member 12 and second insert 118 threading into slot 26 in second frame member 14, first and second frame members 12 and 14, respectively, are position adjacent each other, such that end 25 of first frame member 12 abuts end 27 of second frame member 14. As best seen in FIG. 8, with end 25 of first frame member 12 abutting end 27 of second frame member 14, terminal portion 52 of outer surface 43 of insert 18 is seated against inner surface 142 of centering member 140. As described, it is intended for first and second frame members 12 and 14, respectively, to be positioned such that bore 46 through insert 18 to be axially aligned with bore 128 through second insert 118.

Once bore 46 through insert 18 to be axially aligned with bore 128 through second insert 118, fastener 22 is inserted through the bore 46 of the insert 18 and advanced so as to engage threaded portion 130 of inner surface 126 of second insert 118. Thereafter, a tool or other instrument may be used to engage recess 72 in head 62 of fastener 22 in a mating relationship and to facilitate the threading of threaded portion 68 of shaft 70 of fastener 22 into threaded portion 130 of inner surface 126 of second insert 118. It can be appreciated that as the fastener 22 is tightened on threaded portion 130 of inner surface 126 of second insert 118, first and second frame members 12 and 14, respectively, become joined. Further, it is noted that as fastener 122 is tightened, the centering member 120 is compressed between the first and second inserts 18 and 118, respectively, which, in turn, centers fastener arrangement 116 relative to first and second frame members 12 and 14, respectively.

It is specifically intended that the present invention not be limited to the embodiments and illustrations contained herein, but include modified forms of those embodiments including portions of the embodiments and combinations of members of different embodiments as come within the scope of the following claims.

I claim:

1. A fastening arrangement for joining first and second frame members to one another, each of the first and second frame members including an elongated slot formed therein and a first face at a longitudinal end of the slot, the fastening arrangement comprising:
   a first insert receivable in the slot of the first frame member, the first insert including:
      first and second opposite ends:
      an outer surface having a threaded portion and a frustoconical portion extending from the second end of the first insert, the frustoconical portion including a notch formed therein at a location spaced from the threaded portion of the outer surface; and
      a through bore;
   a fastener extendable through the through bore of the first insert and including a threaded portion; and
   a receiver receivable within the slot in the second frame member and adapted for receiving at least a portion of the threaded portion of the fastener therein for coupling the first and second frame members;
   wherein the notch in the outer surface of the first insert is generally co-planar with the first face of the first frame member with the first insert received in the slot of the first frame member so as to align the first insert within the slot of the first frame member.

2. The fastening arrangement of claim 1, wherein the receiver includes a nut having a bore for receiving the threaded portion of the fastener therein in a mating relationship.

3. The fastening arrangement of claim 1, wherein the receiver includes a second insert receivable in the slot of the second frame member, the second insert including first and second opposite ends, and an inner surface defining a through bore therebetween, the inner surface including a threaded portion adapted for receiving the threaded portion of the fastener in a mating relationship.

4. The fastening arrangement of claim 3, further comprising a centering member positionable between the first and second inserts for centering the first and second inserts relative to one another along a common axis.

5. The fastening arrangement of claim 1, wherein the threaded portion of the outer surface of the first insert is embeddable in the first frame member for securing the first insert thereto.

6. The fastening arrangement of claim 1, wherein the first insert extends along an axis and wherein the outer surface of the first insert expands radially outward with respect to the axis in response to the threading of the threaded portion of the fastener into the receiver.

7. The fastening arrangement of claim 1, wherein the slot in the first frame member extends along an axis between the first face and a second face thereof and wherein the first insert extends along the axis of the slot in the first frame member.

8. The fastening arrangement of claim 1, wherein the slot in the second frame member extends along an axis between the first face and a second face thereof.

9. A method of joining first and second frame members to one another, each of the first and second frame members including an elongated slot formed therein and a first face at a longitudinal end of the slot, the method comprising the steps of:
  positioning a first insert into the slot of the first frame member, the first insert including:
    first and second opposite ends,
    an outer surface having a threaded portion and a frustoconical portion extending from the second end, the frustoconical portion including a notch formed therein at a location spaced from the threaded portion, and
    a through-bore,
  placing a receiver having a bore into the slot of the second frame member; and
  inserting a fastener through the through-bore of the first insert and into engagement with the bore of the receiver so as to join the first frame member and the second frame member,
  wherein the notch in the first insert is generally co-planar with the first face of the first frame member, with the first insert received in the slot of the first frame member, so as to align the first insert within the slot of the first frame member.

10. The method of claim 9, wherein the step of inserting the fastener includes the additional step of urging the surface of the first insert outward in response to the engagement of the fastener into the receiver.

11. The method of claim 9, further comprising the step of positioning the first and second frame members perpendicular to one another.

12. The method of claim 9, further comprising the step of longitudinally aligning the first and second frame members relative to one another.

13. The method of claim 9, wherein the receiver includes a second insert receivable in the slot of the second frame member, the second insert including first and second opposite ends, and an inner surface defining a through bore therebetween, the inner surface of the second insert adapted for receiving the fastener in a mating relationship.

14. The method of claim 13 comprising the additional step of positioning a centering member between the first insert and the second insert to center the first and second frame inserts relative to one another along a common axis as the first frame member and the second frame member are joined.

15. The method of claim 9, wherein the receiver includes a nut having a bore therethrough for receiving the fastener in a mating relationship.

* * * * *